United States Patent
Walthert et al.

(10) Patent No.: US 9,273,747 B2
(45) Date of Patent: Mar. 1, 2016

(54) SUSPENSION CONTROL APPARATUS FOR A BICYCLE AND SUSPENSION CONTROL METHOD

(71) Applicant: DT SWISS INC., Grand Junction, CO (US)

(72) Inventors: Martin Walthert, Aarberg (CH); Stefan Battlogg, St. Anton I.M. (AT)

(73) Assignee: DT Swiss Inc., Grand Junction, CO (US)

(*) Notice: Subject to any disclaimer, the term of this patent is extended or adjusted under 35 U.S.C. 154(b) by 0 days.

(21) Appl. No.: 14/469,798

(22) Filed: Aug. 27, 2014

(65) Prior Publication Data
US 2015/0061241 A1    Mar. 5, 2015

(30) Foreign Application Priority Data

Aug. 27, 2013 (DE) .......................... 10 2013 014 091

(51) Int. Cl.
| | |
|---|---|
| *F16F 9/512* | (2006.01) |
| *F16F 9/18* | (2006.01) |
| *B62K 23/02* | (2006.01) |
| *B62K 25/04* | (2006.01) |
| *F16F 9/32* | (2006.01) |

(52) U.S. Cl.
CPC ............... *F16F 9/512* (2013.01); *B62K 23/02* (2013.01); *B62K 25/04* (2013.01); *F16F 9/185* (2013.01); *F16F 9/3292* (2013.01); *B62K 2025/044* (2013.01); *B62K 2025/048* (2013.01)

(58) Field of Classification Search
CPC ............. B62K 25/04; B62K 2025/044; B62K 2025/048; B62K 23/02; F16F 9/512; F16F 9/185; F16F 9/3292; F16F 9/535; F16F 9/537
See application file for complete search history.

(56) References Cited

U.S. PATENT DOCUMENTS

| | | | | |
|---|---|---|---|---|
| 5,971,116 | A * | 10/1999 | Franklin | 188/282.4 |
| 6,418,360 | B1 * | 7/2002 | Spivey et al. | 701/33.6 |
| 6,491,146 | B1 * | 12/2002 | Yi et al. | 188/319.2 |
| 6,734,376 | B2 * | 5/2004 | Ichida et al. | 200/4 |
| 7,354,320 | B2 * | 4/2008 | Onogi et al. | 439/851 |
| 7,379,798 | B2 * | 5/2008 | Takeda et al. | 701/1 |
| 7,885,740 | B2 | 2/2011 | Izawa et al. | |
| 7,902,967 | B2 * | 3/2011 | Takebayashi | 340/432 |
| 8,091,910 | B2 * | 1/2012 | Hara et al. | 280/283 |
| 8,121,757 | B2 * | 2/2012 | Song et al. | 701/37 |

(Continued)

FOREIGN PATENT DOCUMENTS

| | | |
|---|---|---|
| DE | 102006014833 A1 | 11/2006 |
| DE | 1020100055830 A1 | 6/2012 |
| DE | 102011009405 A1 | 7/2012 |

*Primary Examiner* — Laura Freedman
(74) *Attorney, Agent, or Firm* — Laurence A. Greenberg; Werner H. Stemer; Ralph E. Locher

(57) ABSTRACT

Suspension control and method for controlling a damper device of a bicycle that includes a damper device having a controllable damping valve. The damper device serves to dampen a relative motion between a first and a second component. A control device and a memory device are provided. The control device and the memory device define a characteristic damper curve which is characteristic of a correlation between a damping force and a characteristic parameter of the relative motion between the first and second components. At least one electric operating device is provided by means of which the defined characteristic damper curve can be modified in at least two sections of the characteristic damper curve while riding.

17 Claims, 6 Drawing Sheets

(56) References Cited

U.S. PATENT DOCUMENTS

| | | | |
|---|---|---|---|
| 8,429,061 B2 * | 4/2013 | Shirai | 705/37 |
| 8,453,806 B2 * | 6/2013 | Battlogg et al. | 188/267 |
| 8,458,080 B2 * | 6/2013 | Shirai | 705/37 |
| 8,485,324 B2 * | 7/2013 | Walthert et al. | 188/267.2 |
| 8,561,764 B2 * | 10/2013 | Battlogg et al. | 188/267.2 |
| 8,651,250 B2 * | 2/2014 | Nehl et al. | 188/267 |
| 8,655,548 B2 * | 2/2014 | Ichida et al. | 701/37 |
| 8,744,699 B2 * | 6/2014 | Yamaguchi et al. | 701/51 |
| 8,755,969 B2 * | 6/2014 | Ichida et al. | 701/37 |
| 8,770,357 B2 * | 7/2014 | Sims et al. | 188/267.1 |
| 8,781,679 B2 * | 7/2014 | Ikemoto | 701/37 |
| 8,781,680 B2 * | 7/2014 | Ichida et al. | 701/37 |
| 8,800,730 B2 * | 8/2014 | Battlogg et al. | 188/267.1 |
| 8,825,322 B1 * | 9/2014 | Ikemoto et al. | 701/60 |
| 8,843,273 B2 * | 9/2014 | Wesling et al. | 701/37 |
| 8,886,403 B2 * | 11/2014 | Battlogg et al. | 701/37 |
| 8,910,963 B2 * | 12/2014 | Battlogg et al. | 280/276 |
| 8,939,459 B2 * | 1/2015 | Battlogg et al. | 280/276 |
| 8,967,343 B2 * | 3/2015 | Battlogg et al. | 188/267.2 |
| 8,985,149 B2 * | 3/2015 | Battlogg et al. | 137/807 |
| 9,033,120 B2 * | 5/2015 | Battlogg et al. | 188/267.2 |
| 9,051,988 B2 * | 6/2015 | Battlogg et al. | |
| 2009/0294231 A1 * | 12/2009 | Carlson et al. | 188/267.2 |
| 2012/0160621 A1 | 6/2012 | Battlog et al. | |
| 2012/0186922 A1 | 7/2012 | Battlog et al. | |
| 2012/0221203 A1 * | 8/2012 | Ichida et al. | 701/37 |
| 2012/0253601 A1 * | 10/2012 | Ichida et al. | 701/37 |
| 2013/0334874 A1 * | 12/2013 | Shirai | 307/9.1 |
| 2015/0144443 A1 * | 5/2015 | Battlogg et al. | 188/267.2 |

* cited by examiner

SUSPENSION CONTROL APPARATUS FOR A BICYCLE AND SUSPENSION CONTROL METHOD

CROSS-REFERENCE TO RELATED APPLICATION

This application claims the priority, under 35 U.S.C. §119, of German patent application DE 10 2013 014 091.9, filed Aug. 27, 2013; the prior application is herewith incorporated by reference in its entirety.

BACKGROUND OF THE INVENTION

Field of the Invention

The present invention relates to a suspension control for an at least partially muscle-powered, two-wheeled vehicle and in particular a bicycle and a method for controlling. The suspension comprises at least one damper device for damping shocks acting on the suspension. A bicycle equipped with such a suspension control may be equipped with an auxiliary drive and in particular an electric auxiliary drive.

Many different types of rear wheel dampers and suspension forks for bicycles have been disclosed in the prior art. A shock absorber typically comprises a spring unit for cushioning any shocks occurring and a damping unit for damping the spring vibration. In the case of damper devices configured as rear wheel shock absorbers the spring unit and the damping unit are as a rule configured as an integral unit. In the case of damper devices configured as suspension forks the damping unit and the spring unit may be disposed separately.

Most dampers for bicycles are operated using oil for the damping fluid. For damping, the damping fluid is conveyed from a first damping chamber to a second damping chamber through a valve gate throttling the flow. The size of the valve gate aperture determines the damping strength. An optimal damping is dependent on a number of factors such as for example the rider's weight and in particular the terrain characteristics. It is desirable to set the damping strength in relation to loads and speeds such that weak shocks are dampened less than are heavy shocks. For rides on a road, a forest path, or directly off-road, different damping settings are therefore optimal.

For adjusting and influencing damping, magneto-rheological and electro-rheological fluids have been disclosed whose characteristics can be influenced by way of applying a suitable magnetic or electric field.

Most magneto-rheological fluids consist of a suspension of small magnetically polarized particles which are finely dispersed in a carrier liquid such as oil. The polarizing particles which tend to consist of a carbonyl ferrous powder have typical diameters between approximately 0.1 and 50 micrometers, and under the influence of a magnetic field they form chain-like structures capable of absorbing field-dependent shear stresses. This allows to vary the flow resistance of a valve in a way similar to viscosity changes. The process is fast and reversible such that the initial rheologic state will be reinstated as the magnetic field is broken. Thus, magneto-rheological fluids are suitable to be used in dampers of bicycles.

Such a damper has been described in our commonly assigned prior patent application publication US 2012/0186922 A1 and its counterpart German published patent application DE 10 2011 009 405 A1. The earlier shock absorber for bicycles uses a magneto-rheological fluid serving as the damping fluid. For damping, the damping valve with the damping duct is exposed to a magnetic field of a desired strength to thus achieve the set damping. The bicycle is provided with an exchangeable electronic unit so that a beginner/first time user may use an electronic unit offering little or no adjustment options while an experienced user or expert exchanges the electronic unit for a model having a wider range of adjustment options.

A simple model of such an electronic unit comprises an automatic control mode which automatically provides suitable settings and adapts the damper hardness to the terrain (smooth road, forest path, drystone road, gravel road, downhill across roots). A version for experienced users allows to modify damping or to activate lockout for blocking the damping. An expert version also stores e.g. touring data or sets the damper according to pre-stored data e.g. position-based by way of GPS.

This shock absorber enables flexibility of use and setting of stronger or weaker damping ratios or even controlling based on data previously stored by the rider or other riders or via Internet download (e.g. against a fee or originating from the bicycle community . . . ). A simple, automatically controlled electronic unit will in many situations automatically provide virtually optimal conditions. However, since many experienced users wish to actively control operation, a model providing for manual control of damping characteristics is preferable. A version which provides data stored by other riders or by the actual user enables comparisons with others.

A drawback of the known shock absorber is the fact that for one, when the user selects a simple electronic unit there may be no adjustment options, and for another, when the user selects a complex electronic unit, the multitude of adjustable parameters makes it difficult to obtain suitable settings.

SUMMARY OF THE INVENTION

It is accordingly an object of the invention to provide a suspension control and a control method which overcome the disadvantages of the heretofore-known devices of this general type and which provide for a suspension control and a matching two-wheeled vehicle and a method for controlling to allow flexible though still clear and simple setting options for the damper device of a bicycle.

With this and other objects in view there is provided, in accordance with the invention, a suspension control apparatus for an at least partially muscle-powered two-wheeled vehicle, comprising:

at least one damper device having at least one controllable damping valve and being configured to serve to dampen a relative motion between a first component and a second component;

a control device and a memory device;

said control device and said memory device defining at least one characteristic damper curve that is characteristic of a correlation between a damping force and a parameter characteristic of a relative motion between the first and second components;

at least one electric operating device configured to modify the defined characteristic damper curve during a ride of the two-wheeled vehicle, in at least two sections of the characteristic damper curve.

In other words, a suspension control according to the invention for an at least partially muscle-powered bicycle comprises at least one damper device having at least one controllable damping valve. The damper device is provided for damping relative motions between a first and a second component. Furthermore at least one control device and at least one memory device are provided. The control device and the memory device define at least one characteristic damper curve which is characteristic of a correlation between a damping force and a parameter that is characteristic of the relative motion between the first and second components. The characteristic damper curve describes the desired or currently set correlation between the damping force and the actually present characteristic parameter such as the relative speed. At least one electric operating device is provided with which to modify the defined characteristic damper curve in at least two sections of the characteristic damper curve, preferably independently of one another and in particular while riding.

The suspension control according to the invention has many advantages since it enables an adjustment option for the characteristic damper curve of a suspension control that is easy to understand, clear in layout, and flexible. Unlike in the previously known prior art the damper device is not primarily controlled by previously known data stored for example during a previously traveled lap. Also, the suspension control is primarily not adjusted by way of for example setting a lockout or a hard or soft damping ratio but the basic damping settings are based on the characteristic damper curve being modifiable in at least two sections independently of one another. This means that e.g. in a section showing a low parameter and e.g. a slower relative speed between the two components a stronger damping can be set while in a section showing a higher parameter and e.g. a higher relative speed between the two components, a weaker (or else a still stronger) damping can be set.

For temporary, brief control, the damping hardness can additionally be changed or a lockout can be activated. These measures serve to temporarily control the damper properties directly while the operating device serves to change the characteristic damper curve per se, thus the way in which the control generally responds to shocks.

In particular if the characteristic damper curve is illustrated in graphical form this setting allows a most illustrative and readily comprehensible way of setting the damper properties. This enables a reproducible, precise setting and controlling of the damper properties, while also providing a high recognition value since the human brain can readily memorize curves.

It is in particular possible for the characteristic damper curve to be variable in at least 3, 4 or more different segments preferably independently of one another and in particular in operation. Adjusting in operation allows direct response and immediate feedback so that the user can quickly find and set what for him is the optimal characteristic damper curve.

The characteristic damper curve defines the desired and set correlation between parameters such as in particular a relative speed of the components dampened relative to one another, and the pertaining, desired damping force.

The characteristic parameter is preferably derived from a relative speed of the relative motion between the first and second components. The characteristic parameter preferably corresponds to the relative speed of the relative motion between the first and second components.

Preferably at least one sensor device is provided and the control device and the sensor device are configured and set up to periodically obtain at least one characteristic value for the relative speeds between the first and second components. The control device is configured and set up to derive, by means of the characteristic value from the characteristic damper curve stored in the memory device, a pertaining setting for the controllable damping valve and to set the damping valve accordingly so as to set a damping force ensuing from the characteristic damper curve based on the characteristic value obtained.

Preferably at least one characteristic value for the relative speed is obtained and the pertaining setting for the controllable damping valve is derived and set, within a time period of less than 100 milliseconds, preferably less than 50 milliseconds, so that the damping force is set within the period resulting from the currently active characteristic damper curve with the characteristic value obtained.

Preferably the operating device comprises two or more operating members or controls with which to vary the characteristic damper curve. Preferably the characteristic damper curve is displayed on a graphical interface of the operating device. Employing the at least two controls allows to change the characteristic damper curve in at least two sections while the result is directly shown graphically.

In preferred specific embodiments the operating device comprises at least one touch-sensitive display or touchscreen showing the characteristic damper curve. Touching the characteristic damper curve in predetermined or preferably optional points and dragging the line allows to change the characteristic damper curve preferably nearly arbitrarily.

In all the configurations it is preferred for a zero passage of the characteristic damper curve to be displaceable. For example the zero passage of the damping force can be shifted to any desired positive or negative relative speeds of the relative motion between the first and second components.

In preferred specific embodiments a modified characteristic damper curve is set and/or stored in the memory device as the current or effective characteristic damper curve within less than 1 minute. This time period is, in particular, even less than 1 second. A characteristic damper curve stored in the memory device may be provided with a significant name and may be retrieved from the memory device and activated as needed. It is possible for a modified characteristic damper curve to require confirmation prior to validation. In normal operation the system accepts a modified characteristic damper curve within less than 0.1 seconds and preferably less than 50 milliseconds or even 20 milliseconds so that changes to the characteristic damper curve are effective virtually immediately.

In advantageous specific embodiments the operating device is suitable and configured to set a characteristic damper curve so that a higher relative speed allows to set a lower damping force than does a lower relative speed. This configuration offers particularly many advantages since for example minor and tiny shocks are virtually not damped at all while major shocks caused for example by passing over curbs or roots or rocks are damped virtually ideally.

The damper device comprises particularly preferably a magneto-rheological fluid serving as the damping medium and the damping valve has an electric coil device assigned to it serving as the field generating device. A current intensity of the electric coil device is preferably reset periodically, the time periods being shorter than 1 second and in particular shorter than 50 or 20 milliseconds. The currently set current intensity is leveled with the characteristic value obtained for the relative speeds between the two components.

The characteristic damper curve which basically defines the correlation between the relative speed and the pertaining damping force desired, may also include values for relative speeds or the like and pertaining current intensities in tabular form or the like. As a relative speed is obtained, the pertaining current intensity is then set so that the pertaining damping force ensues automatically.

The derived characteristic value for the relative speed between the two components can be directly measured as a speed value. Or else it is possible to provide e.g. a distance measuring device to capture the relative distance or the absolute distance between the two components and to derive from a distance signal via the time constant or the time interval used for measuring what is the current relative speed. It is also possible to derive the characteristic value for the relative speed from the measurement values of one or more acceleration sensors. A temporal integration of the values of one or more acceleration sensors allows to draw conclusions about the relative speeds between the two components.

In particularly preferred configurations at least two different electric operating devices are provided concurrently. Preferably, one actuating device is provided serving as the operating device and an adjustment device is provided serving as the operating device. Both these operating devices are suitable and set up for varying independently of one another, at least one damping property of the damper device. This means that at least one damper property selected with the actuating device may also be modified using the adjustment device. For example the actuating device may select a specific damper property which e.g. the adjustment device may cancel later.

It is particularly preferred for the actuating device to be more robust and in particular more shock-resistant than the adjustment device. The actuating device preferably comprises protection according to IP54 and in particular protection according to IP67 under the DIN standard EN 60529. Preferably the actuating device comprises protection from external impacts at least according to IK06 under DIN EN 62262.

IP54 according to DIN EN 60529 means that the actuating device is protected from dust and that complete protection against accidental contact and against directionless splash water is given. The actuating device preferably shows protection at least according to IP67, meaning that the actuating device is dustproof, has complete protection against accidental contact and also protection against temporary immersion of the actuating device. Impact resistance according to IK06 in DIN EN 62262 means that there is at least impact resistance up to an impact energy of 1 joule. Protection is preferably provided for an impact resistance according to IK07 according to which impact energy of 2 joule can be handled.

The adjustment device may show the same requirements, although its protection against dust, water, and impacts may be lower since in particular the operating device is not permanently attached to the bicycle. The actuating device is preferably provided to be fixedly mounted on the bicycle. Preferably the actuating device is fixedly attached to the bicycle handlebar. The actuating device preferably shows a number of separate controls which serve to set a damper hardness, to set a lockout, and preferably to set a see-saw suppression. Each of the controls may be configured as a shifter or switch or the like which when actuated switches states or else performs increases or decreases. The controls are in particular configured as shifters, pressure controls, rotary controls, toggle switches, rotary/pressure actuators, slide switches, or push buttons.

While the actuating device is preferably more robust than the adjustment device and comprises few, separate controls for example for increasing damping or for setting a lockout or see-saw suppression, the adjustment device may serve for more complex settings or to adjust the damper device.

Preferably a suspension control is provided for an at least partially muscle-powered bicycle having at least one damper device and having a magneto-rheological fluid serving as the damping fluid, and at least one controllable damping valve, and at least one electric coil device assigned to the damping valve. Generating a magnetic field by means of the electric coil device allows to influence the magneto-rheological fluid and to adjust a damping force at the damper device. The damper device serves to dampen relative motions between a first and a second component. At least one control device, at least one memory device, and at least one sensor device are provided. The control device and the memory device define at least one characteristic damper curve. The characteristic damper curve may be stored in the memory device. The characteristic damper curve is characteristic of a correlation between a damping force and a parameter that is characteristic of the relative motion between the first and second components. In preferred configurations the characteristic damper curve describes the correlation between the damping force and an obtained or derived relative speed of the relative motion between the first and second components. The control device and the sensor device are configured and set up to periodically obtain or derive at least one characteristic value for the characteristic parameter and in particular for the relative speeds between the first and second components. The control device is configured and set up to derive, by means of the characteristic value from the characteristic damper curve, a pertaining setting for the controllable damping valve and to set the damping valve accordingly, so as to set a damping force ensuing from the characteristic damper curve based on the value obtained. At least one electric adjustment device is provided by means of which the rider can vary the characteristic damper curve stored in the memory device or retrieved from the memory device, at least in two sections, preferably independently from one another and in particular while riding.

According to another configuration according to the invention the suspension control is provided for an at least partially muscle-powered bicycle and comprises at least one controllable damper device having at least one controllable damping valve. The damper device serves to dampen a relative motion between a first and a second component and the at least one electric control device is provided for controlling the damper device. At least two electric operating devices are provided showing differences in complexity namely, one simple operating device serving as the actuating device, and a more complex operating device serving as the adjustment device wherein the two electric operating devices are suitable and set up for varying concurrently and independently from one another at least one damper property of the damper device so that at least one damper property selected by the actuating device can be modified by the adjustment device.

This suspension control according to the invention also has many advantages since for one, it allows many adjustment options and for another, it ensures particular ease of operation. The fact that the actuating device is less complex, for example allowing to directly shift damping curves or damping steepnesses or the like by push buttons or switches or the like while at the same time enabling a more complex operation on a more complex operating device which offers a wider range of setting options for the damper device, allows ideal combinations and ideal operation of the suspension control.

It is the operating device that is more "complex" since it allows to set and/or adjust more and different parameters. The more complex operating device allows to set a much larger number of parameters. Operation is preferably simple and uncomplicated, in particular self-explanatory. The complexity increases automatically due to the quantity of variable settings.

The simpler operating device, namely the actuating device, is provided to be attached to the handlebar. The actuating device is in particular attached near the ends of the handlebar to allow the user to operate the actuating device for example with his thumb or fingers while keeping his hands in the gripping position on the handlebar. This eliminates the need for the user to change hand positions which is time-consuming and may be dangerous so that the rider can shift the damper device for example even during a bumpy downhill ride. It is a particular advantage that the rider does not need to look at the handlebar in operation for actuating. This allows touch operation. These operational options are very comfortable and important specifically in riding downhill. Specific designs of the push buttons showing e.g. elevations, depressions, and shapes are helpful.

To avoid contact or operational problems in challenging ambience conditions the actuating device preferably comprises at least one mechanical input device which for generating an input can be mechanically displaced at least in part and which must be displaced for input. The mechanical input device of the actuating device emits electric signals to the control device or else it shows different electric properties in relation to its current position. For example the resistance may change during actuation.

A third operating device such as an external computer may be provided to supplement the first and second operating devices.

The more complex operating device preferably has a display for showing the characteristic damper curve and optionally further parameters and it may at the same time serve as a bicycle computer or the like. It is also possible for this operating device to have a touch-sensitive display to thus carry out changes to the characteristic damper curve by dragging single points or sections of the characteristic damper curve.

This operating device may be a special bicycle computer or it may be a smartphone or tablet computer or the like and preferably it has a wireless link with the suspension control. This bicycle computer or smartphone or the like may but does not need to be mounted to the handlebar for operation; it may for example be located in a backpack, on the upper arm (sleeve pocket) or in a pants pocket or the like from which it is taken out as needed for example for adjusting the characteristic damper curve in the graph. The modified characteristic damper curve is effective immediately so as to allow modifications while riding. The combination of a robust, mechanical actuating device with an adjustment device showing a clear graphics layout achieves a particularly simple, efficient, and precise adjustment of the characteristic damper curve and thus of the damper properties of the suspension control even in operation while riding. The actuating device enables the experienced user to switch between frequently employed damper states—even without looking. A specific switch may be provided for example for activating lockout or see-saw suppression. Making these adjustments on a smartphone is more difficult while riding downhill because the user must look away from the terrain for operating the smartphone touchscreen. It is still more difficult or even impossible when wearing gloves.

In an advantageous configuration the suspension control is provided for an at least partially muscle-powered bicycle and comprises at least one damper device having at least one controllable damping valve wherein the damper device serves to dampen a relative motion between a first and a second component. At least one control device for controlling the damper device, at least one memory device, and at least one sensor device are provided. The controllable damping valve has at least one electric coil device assigned to it serving as the field generating device. The field generating device can influence a magneto-rheological fluid for adjusting a damping force of the damper device by applying a current intensity to the electric coil device. The control device and the sensor device are configured to obtain at least one characteristic value of a characteristic parameter such as in particular a relative speed of the first to the second component. The control device is configured to derive by way of the characteristic value from a characteristic damper curve stored in the memory device a pertaining current intensity for the electric coil device and to set the electric coil device to such value to generate a damping force which results from the characteristic damper curve based on the characteristic value obtained or which is provided in the characteristic damper curve based on the characteristic value obtained. At least two different electric operating devices are provided for setting the damper device, namely an actuating device and an operating device. These two operating devices are set up and configured for varying independently from one another at least one damper property of the damper device so that at least one damper property selected by the actuating device can also be modified by the adjustment device. Both the actuating device and the operating device are capable of varying the damper properties in operation. This means that the suspension control does not need to be deactivated nor does the vehicle need to stop for varying the damper properties. The damper properties can be modified at least with the vehicle stationary. Operation is preferably possible while riding so that the damper properties can be modified at all times up to a specific speed or else at full speed.

In all the configurations, controlling is preferably done in real time so that the damper device responds to shocks or the like adequately and appropriately within a time interval of preferably 20 or 50 milliseconds or preferably shorter.

With the above and other objects in view there is also provided, in accordance with the invention, a novel bicycle that comprises a supporting structure having a frame, a steering device, and two wheel accommodations at the supporting structure. The supporting structure accommodates two wheels. At least one suspension control as described above is provided. The suspension control serves to control at least one damper device for damping a relative motion between at least one of the wheels and in particular both of the wheels, versus the supporting structure. The supporting structure comprises in particular the fixed bicycle components to which the wheels are attached so as to be movable and dampened. The supporting structure may in particular comprise the frame and the inner tube or inner tubes of a suspension fork.

In a preferred specific embodiment the actuating device is attached to the steering device and the steering device comprises a handlebar. Then the actuating device preferably comprises at least one mechanical input device in the region of at least one of the lateral ends of the handlebar. Preferably each of the lateral handlebar ends is provided with at least one mechanical input device to allow varying the damper properties of the suspension fork at one of the handlebar ends while the damper properties of the rear wheel are influenced at the other of the handlebar ends.

The adjustment device is preferably attached to the handlebar device by way of express coupling. The actuating device is preferably fixedly attached to the steering device.

A method according to the invention for controlling a suspension serves to control a suspension of a bicycle that is at least partially muscle-powered and comprises at least one controllable damper device having at least one controllable damping valve. The damper device dampens a relative motion between first and second components. An electric control device controls the damper device. At least one characteristic damper curve is provided which describes the correlation between the damper force and the relative speed of the relative motion between the first and second components. The at least one characteristic damper curve is stored in a memory device. The characteristic damper curve is variable in at least two sections of the characteristic damper curve in particular independently of one another.

Another method according to the invention likewise serves to control the suspension of an at least partially muscle-powered bicycle comprising at least one controllable damper device which comprises at least one controllable damping valve. The damper device dampens a relative motion between first and second components and is controlled by an electric control device of the damper device. The damper device is selectively set and adjusted using two different electric operating devices which are in particular present at the same time at least temporarily. Namely, operation may be performed by means of an actuating device for one and for another by operating an adjustment device. This allows to vary at least one damper property of the damper device by means of the actuating device, independently of the adjustment device so that a damper property selected by the actuating device may also be varied using the adjustment device. Adjusting the damper device takes place in particular and preferably while riding.

The adjustment device for example allows to set 3 different characteristic curves which can then simply be selected on the actuating device while riding. The actuating device for example allows to shift between two, three, or four characteristic damper curves in sequence. This may be done by way of a shifter actuating the characteristic damper curves in a rotating sequence or else by providing different switches to actuate the appropriate characteristic damper curve.

Preferably at least one sensor device is provided to act as a damper sensor capturing at least one characteristic value of the damper device. A time interval between two successively obtained characteristic values is preferably shorter than 20 milliseconds and in particular shorter than 10 milliseconds and preferably shorter than 5 milliseconds. A regulating speed is faster than 40 milliseconds and in particular faster than 20 milliseconds and it may be faster than 10 milliseconds. The interval between a relative motion of the two components to one another and the resulting modified damping force is preferably less than 30 or preferably 20 milliseconds and in particular less than 10 milliseconds.

The characteristic damper curve is preferably graphically illustrated on a display. The shape of the characteristic damper curve can preferably be graphically modified on the display. The characteristic damper curve can be modified by touching and displacing points and areas on a touch display.

Other features which are considered as characteristic for the invention are set forth in the appended claims.

Although the invention is illustrated and described herein as embodied in a suspension control for a bicycle and method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

With reference to the enclosed figures, we will in the following describe an exemplary embodiment of a bicycle 200 equipped with a suspension control 300 and shock absorbers 100.

Figure 1:
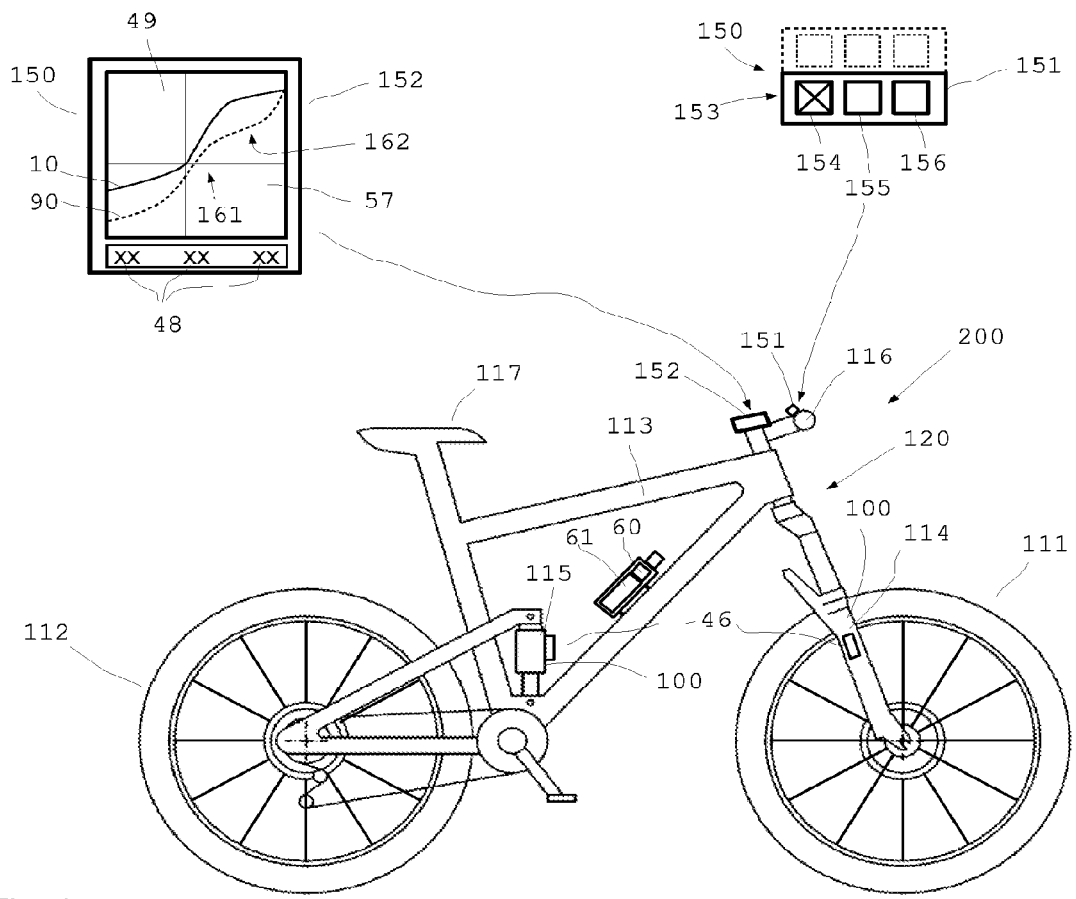
FIG. 1 is a schematic view of a bicycle equipped with a shock absorber according to the invention.

Referring now to the figures of the drawing in detail and first, particularly, to FIG. 1 thereof, there is shown a schematic illustration of a bicycle 200 which is configured as a mountain bike and comprises a frame 113 and a front wheel 111 and a rear wheel 112. Both the front wheel 111 and the rear wheel 112 are equipped with spokes and may be provided with disk brakes. A gear shifting system serves to select the transmission ratio. Furthermore the bicycle 200 comprises a steering device 116 with a handlebar. Furthermore a saddle 117 is provided.

The front wheel 111 is provided with a shock absorber 100 configured as a suspension fork 114 and the rear wheel 112 is provided with a shock absorber 100 configured as a rear wheel damper 115.

A central control device 60 is provided together with a battery unit 61 in a water bottle-like container and disposed on the down tube where a water bottle can be received. Or else the central control device 60 may be disposed on the handlebar 116.

The central control device 60 serves as a suspension control 200, controlling both the suspension fork 114 and the rear wheel shock absorber 115, separately and in particular in synchrony. Control of the shock absorbers 100 and further bicycle components may be provided in dependence on many different parameters and is also done by way of sensor data. Optionally the suspension and/or damping characteristics of the seat post can be adjusted. It is possible to also control by way of the central control device 60 the shifting system for adjusting different transmission ratios.

Additionally each of the shock absorbers 100 comprises at least one control device 46 at an electronic unit provided to be exchangeable. The electronic units may each comprise a separate battery unit. However, energy supply is preferred by way of the central battery unit 61 or supported or operated by a dynamo or the like.

The suspension control 200 and the central control device 60 are operated via operating devices 150. Two operating devices 150 are provided, namely an actuating device 151 and an adjustment device 152. The actuating device 151 comprises mechanical input devices 153 at the lateral ends or in the vicinity of the lateral ends 116 of the handlebar. The adjustment device 152 may be configured as a bicycle computer and may likewise be positioned at the handlebar 116. Or else it is possible to employ a smartphone or a tablet computer or the like for the adjustment device 152 which is for example located in the user's pocket or backpack while no modifications to the settings need to be made.

The actuating device 151 comprises three mechanical input devices serving as the controls 154, 155, 156 for operating the shock absorber 100. It is possible to dispose an actuating device 151 for the suspension fork 114 at one of the ends 116 of the handlebar and to provide another actuating device 151 for the rear wheel shock absorber 115 at the other of the handlebar ends. It is also possible to control both shock absorbers in synchrony via an actuating device 151. It is also possible to dispose at one of the ends of the handlebar 116 an actuating device for example with six different controls for adjusting the two shock absorbers 100.

The actuating device 151, which is considerably more robust and sturdier than the operating device 152, is fixedly mounted to the handlebar 116. Each of the controls 154 to 156 designed as pressure switches or push buttons shows protection according to IP54 or better, according to IP67 under DIN EN 60529. Protection from impacts is provided at least according to IK06 under DIN EN 622622. The controls 150 to 156 are thus sufficiently protected in normal operation so that the controls are not damaged in operation due to usual shocks or the like. Moreover the robust controls 154 to 156 provide for reliable operation even while riding downhill or the like.

In contrast to this the adjustment device 152, which is for example clipped to the handlebar or remains in the user's pocket or backpack, offers a considerably larger number and/or clearly arranged adjustment options and it may be employed for modifying a displayed characteristic damper curve 10 in at least two or more sections 161, 162 etc. for setting the desired damper properties. The adjustment device 150, referred to as an operator's control device, has a display 49 and may also output data 48 for example relating to the damper settings or else data about the current traveling speed etc.

The display 49 is in particular configured as a graphical control unit or touchscreen 57 so that the user can for example touch a displayed characteristic damper curve 10 with his fingers and modify it by dragging. This allows to generate from the characteristic damper curve 10 shown in a solid line, by touching said line in one or more points 170 to 175, the illustrated characteristic damper curve 90 which is immediately and henceforth employed for the suspension control 300. Modifying the characteristic damper curve 10, 90 is also possible while riding.

The adjustment device 152 may also serve as a bicycle computer, displaying data about the current speed, and the average speed and/or kilometers per day, per tour, per lap, and total. It is also possible to display the current position, the current elevation of the route traveled and the route profile and also the estimated operational range under the current damping conditions.

Figure 2:
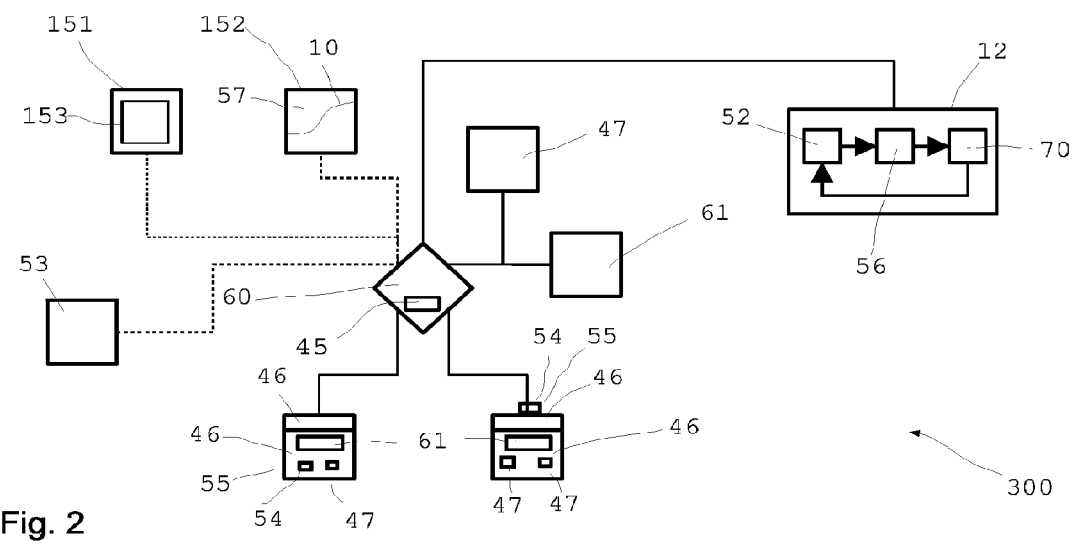
FIG. 2 is a schematic view of the control configuration structure of the bicycle according to FIG. 1.

FIG. 2 shows a schematic illustration of the suspension control 300 and the communication links of some of the components involved. The central control device 60 may be connected with the individual components either wire-bound or wireless. The control device 60 may be connected with the other components for example through WLAN, Bluetooth, ANT+, GPRS, UMTS, LTE, or other transmission standards. Optionally the control device 60 may be connected wireless with the internet 53 via the link shown in a dotted line.

The control device 60 is linked with the battery unit 61. Furthermore the control device 60 may be linked with a sensor device 47 or with multiple sensors. The operating devices 150, namely the actuating device 151 and the adjustment device 152, are coupled with the control device 60 either wire-bound or wireless at least temporarily. Although the actuating device 151 is preferably coupled with the control device wire-bound, it may be linked wireless and may be provided with a separate battery such as a button cell or the like.

The actuating device 151 which is robust in structure comprises at least one mechanical input device 153 in the shape of a switch or the like for outputting switching commands to the control device 60 for switching at least one damper property. This may for example be, activating a lockout or activating a see-saw suppression or adjusting the damper hardness. Preferably a separate operating knob or the like is provided for each of these properties. Or else it is possible to use one single, mechanical input device 153 for switching between options.

The adjustment device 152 comprises a graphical control unit such as a touch-sensitive screen and can show on the display 49 the current characteristic damper curve 10 among other things. For example touching and dragging the characteristic damper curve in single points 169, 170, 171, 172 and 173 allows to displace the characteristic damper curve 10 basically as desired to the sides or up and down. The individual points 169, 170, 171, 172 or 173 etc. are preferably linearly linked. The individual points may also be linked dynamically via splines so as to obtain a rounded characteristic damper curve.

The control device 60 is connected with control devices 46 of the shock absorbers 100 at the front wheel and the rear wheel via network interfaces 54. The control device 46 possibly provided at each of the shock absorbers 100 takes care of local controlling and may comprise a battery each or else it may be connected with the central battery unit 61. It is preferred to control both the shock absorbers via the control device 60.

Preferably each of the shock absorbers 100 is provided with at least one sensor device 47 for sensing relative motions between the components 101 and 102. After obtaining a characteristic value of the relative speed the pertaining damping force is set or adjusted by way of the characteristic damper curve 10 of the shock absorber 100 stored in the memory device 45.

FIG. 2 schematically shows the control cycle 12 which is stored in the memory device 45 and is backed up in or programmed into the control device 60. The control cycle 12 is periodically, in particular continuously periodically, performed in operation. In step 52 the sensors 47 capture a current relative motion or current relative speed of the first component 101 relative to the second component 102. In step 52 a characteristic value is derived from the values of the sensor 47 or the sensors which is representative of the current relative speed. Thereafter in step 56 the pertaining damping force 84 to be set is then derived from the obtained characteristic value 81 (see FIGS. 10, 11) taking into account the predetermined or selected characteristic damper curve. A measure of the field intensity or current intensity to be currently set is derived therefrom with which the damping force to be set is achieved at least approximately. The measure may be the field intensity or else it may e.g. indicate the current intensity with which the damping force to be set is achieved at least approximately.

In the subsequent step 70 the field intensity to be currently set is generated or the respective current intensity is applied to the electrical coil device 11 which serves as the field generating device, so that within one single cycle or one time period of the control cycle 12 the damping force is generated as it is provided for the selected or predetermined characteristic damper curve to the current speed ratio of the first component relative to the second component. Thereafter the next cycle starts and step 52 is performed once again.

Figure 3:
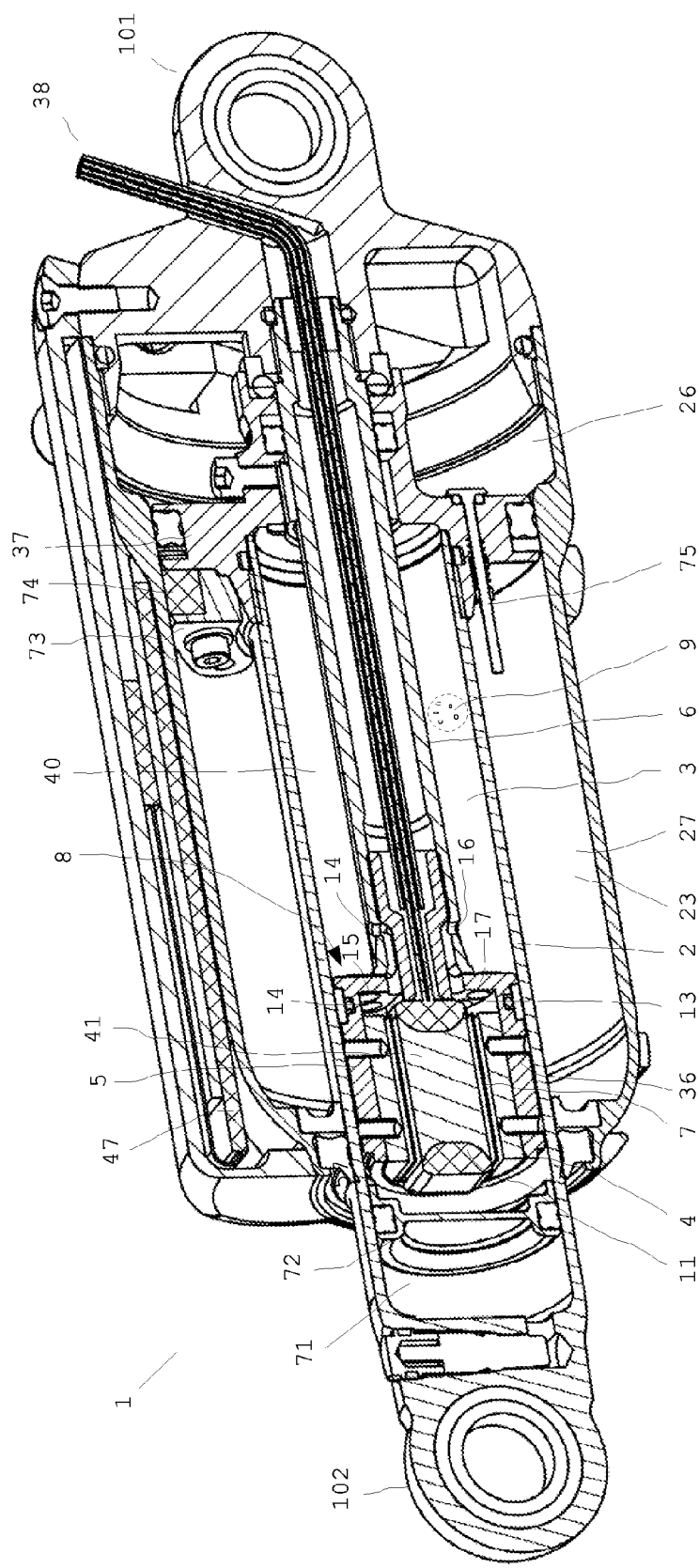
FIG. 3 is a schematic sectional view of a shock absorber of the bicycle according to FIG. 1.

FIG. 3 shows a simplistic cross-sectional view of a shock absorber 100 which is presently employed for example in the rear wheel damper 115.

The shock absorber 100 comprises a damper device 1. The shock absorber 100 is fastened by the first end serving as the component 101 and the second end serving as the component 102, to different parts of the supporting structure 120 or the frame 113 for damping relative motions.

In the damper housing 2 a damping piston unit 40 is provided which comprises a damping piston 5 serving as the damping valve 8 and a piston rod 6 linked therewith. The damping piston 5 is provided with the damping valve 8 therein which presently comprises a field generating device 11 and in particular an electric coil for generating a suitable field intensity. The magnetic field lines run in the central region of the core 41 approximately perpendicular to the longitudinal extension of the piston rod 6 and thus pass through the damping ducts 20, 21 approximately perpendicular (see FIG. 4). This causes the magneto-rheological fluid present in the damping ducts 20 and 21 to be effectively influenced so as to allow efficient damping of the flow through the damping valve 8. The shock absorber 100 comprises a first damper chamber 3 and a second damper chamber 4 separated from one another by the damping valve 8 configured as the piston 5. In other configurations an external damper valve 8 is possible which is disposed external of the damper housing 2 and connected via supply lines.

The first damper chamber 4 is followed toward its end 102 by the equalizing piston 72 and thereafter the equalizing space 71. The equalizing space 71 is preferably filled with a gas and serves to equalize the piston rod volume which in compression enters into the entire damper housing 2.

Magneto-rheological fluid 9 serving as the field-sensitive medium is present not only in the damping valve 8 but in the two damping chambers 3 and 4 on the whole.

The flow duct 7 between the first damper chamber 3 and the second damper chamber 4 extends, starting from the second damper chamber 4, firstly through the fan-type damping ducts 20 and 21 which at the other end lead into the collection chamber 13 or collection chambers 13. The magneto-rheological fluid collects there after exiting the damping ducts 20, 21 before passing through the flow apertures 14, 15 into the first damping chamber 3. In compressing, i.e. in the compression stage, flow passes through all of the flow apertures 14, 15. This means that the major portion of the flow presently passes through the flow apertures 15 and the one-way valves 17 at the flow apertures 15 automatically open such that the magneto-rheological fluid can pass out of the second damper chamber 4 into the first damper chamber 3.

In the compressed state illustrated the first damper chamber 3 is radially entirely surrounded by the second spring chamber 27 of the spring device 26. This allows a particularly compact structure.

In the case of complete rebound of the shock absorber 100 a spring-loaded plunger 75 causes pressure compensation between the first spring chamber 26 and the second spring chamber 27.

The spring piston 37 is provided at the end of the damper housing 2. Disposed thereat is a holder 73 supporting a magnet 74. The magnet 74 is part of a sensor 47. The sensor 47 comprises a magnetic potentiometer which captures a signal that is representative of the position of the magnet 74 and thus of the spring piston 37. This potentiometer 47 does not only permit to determine a relative location but presently also permits to determine the absolute stage of compression or rebound of the shock absorber 100.

Figure 4:
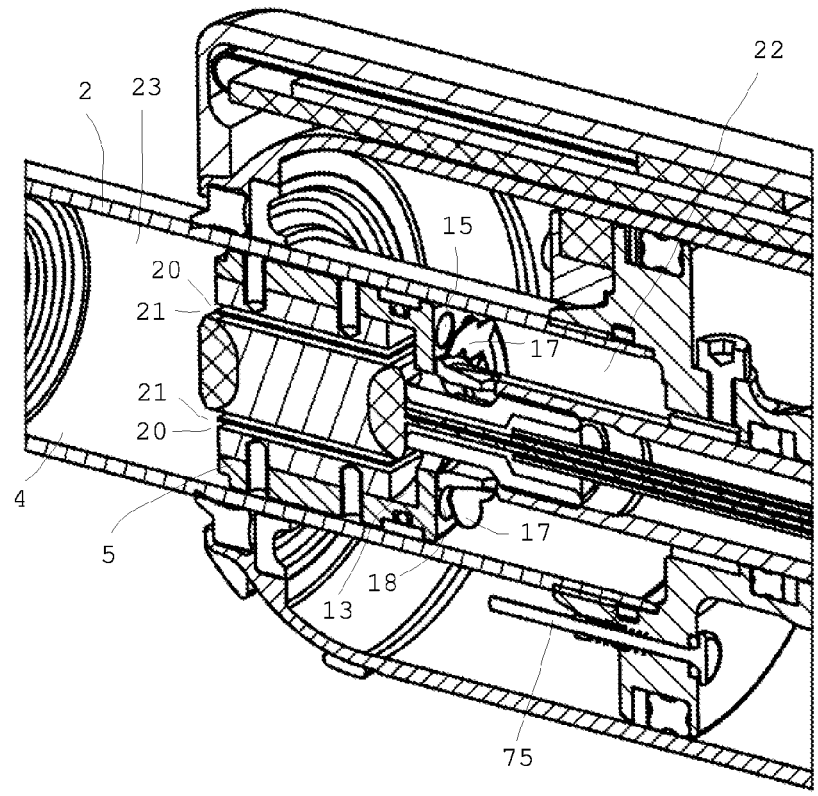
FIG. 4 is a sectional side view of the shock absorber according to FIG. 3 in an enlarged illustration in the compression stage.
Figure 5:
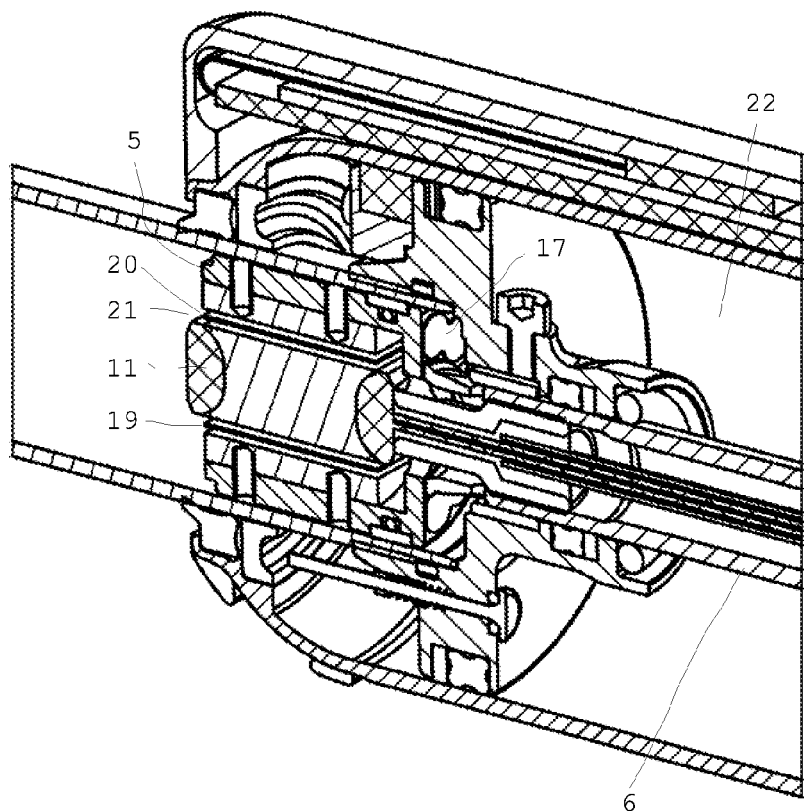
FIG. 5 is an enlarged sectional illustration of the shock absorber in the rebound stage.

FIGS. 4 and 5 show partially enlarged details of the illustration according to FIG. 3, FIG. 4 illustrating the compression stage and FIG. 5, the rebound stage.

Figure 9:
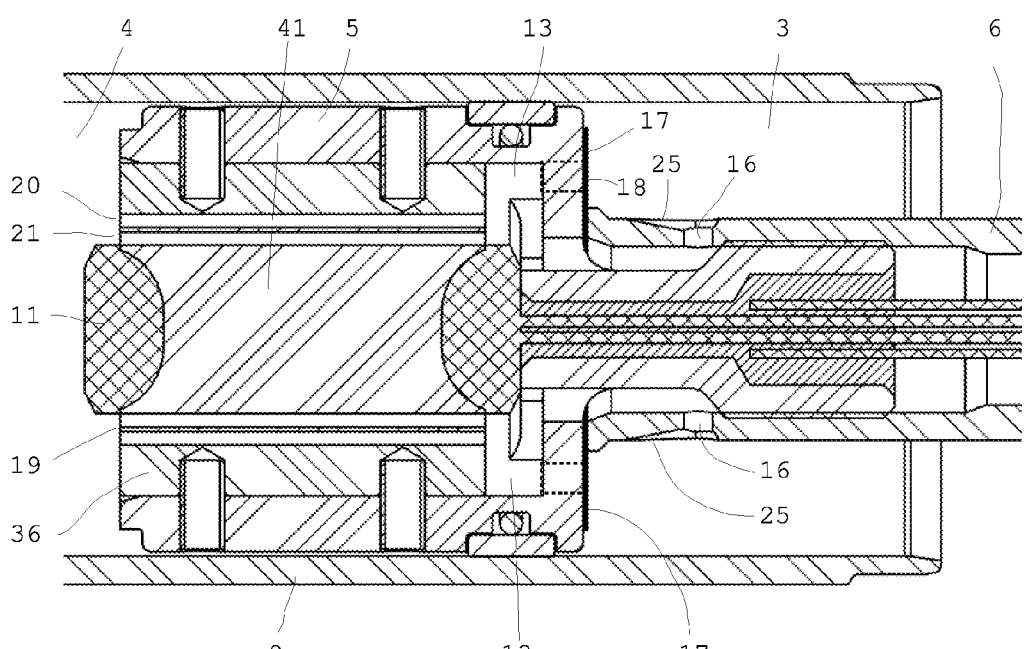
FIG. 9 is an enlarged cross section of the piston unit.

In the compression stage as illustrated in FIG. 4, i.e. in compressing, the magneto-rheological fluid 9 emerges from the second damper chamber 4 through the damping ducts 20, 21, entering the damping piston 5. The flow resistance through the damping ducts 20, 21 depends on the magnetic field of the field generating device 11 configured as an electric coil. After leaving the damping ducts 20, 21 the magneto-rheological fluid collects in the two collection chambers 13 (see FIGS. 9 and 13), thereafter passing through the flow apertures 15, which are permeable in the compression stage, with the one-way valves 17.

In the rebound stage as illustrated in FIG. 5 the magneto-rheological fluid flows from the side 22, the side of the piston rod 6, toward the damping piston 5. The one-way valves 17 at the flow apertures 15 close automatically such that only the flow apertures 14 configured as through holes 16 in the piston rod 6 remain for putting the magneto-rheological fluid into the damping piston 5. When the magneto-rheological fluid 9 has entered through the through hole 16 into the collection chamber 13 or into the collection chambers 13, the magneto-rheological fluid evenly flows through all the fan-type damping ducts 20, 21 until the magneto-rheological fluid exits from the damping piston 5 on the other flow side 23. It can also be clearly seen in FIG. 5 that the damping piston 5 comprises an electric coil serving as the field generating device 11, a core 41 of a magnetically conducting material and a ring conductor 36. Furthermore an insulating material 42 may be provided.

The collection chamber 13 enables an efficient series connection of the one-way valves 17, which are in particular configured as shim valves, with the damping ducts 20, 21. The collection chamber 13 serves to avoid in particular inadmissibly high loads on the fan walls 19 due to different pressures in the damper ducts 20, 21. Operating pressures of 30 bars, 50 bars and more can occur which, given different loads on both sides of a fan wall 19 may lead to destruction of the thin fan walls 19.

Figure 6:
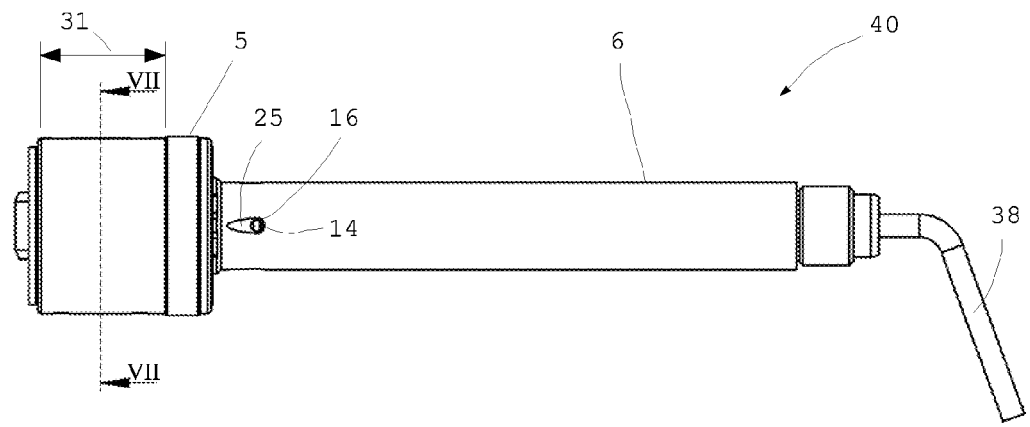
FIG. 6 is the piston unit of the shock absorber according to FIG. 3.

FIG. 6 shows a side view of the damping piston unit 40 with the damping piston 5 and the piston rod 6 from the end of which the cable 38 protrudes. The length 31 of the damping ducts 20, 21 is exemplarily tightened. In this illustration one can clearly see the flow aperture 14 configured as a through hole 16 with the inclined inlet 25 following, which provides for an automatically increasing end position damping. When the shock absorber 100 rebounds nearly entirely, then the spring piston 37 firstly slides across the flow aperture 16 and thereafter across the inlet 25, so as to have the flow cross-section continually decreasing and thus the damping force automatically increasing.

Figure 7:
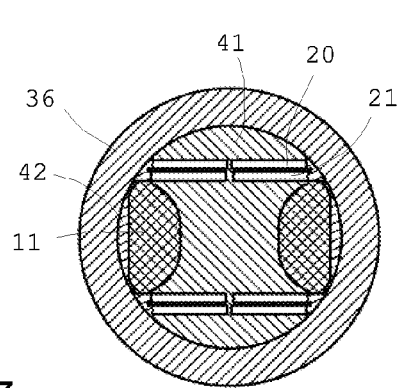
FIG. 7 is the cross section taken along the line VII-VII in FIG. 6.

FIG. 7 shows the cross-section taken along the line VII-VII in FIG. 6. The core 41 is surrounded by the field generating device 11 configured as a coil. Damping ducts 20 and 21 are disposed in the core. The core and the coil are radially surrounded by ring conductors 36.

Figure 8:
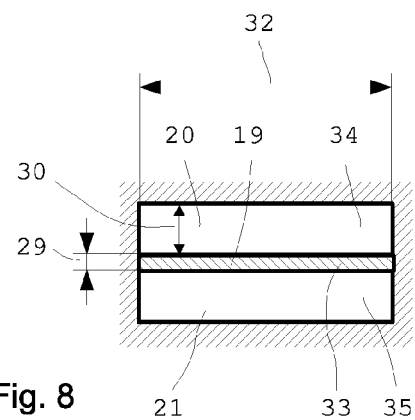
FIG. 8 is a diagrammatic figure of the fan-like damping ducts.

FIG. 8 shows an enlarged illustration of the damping ducts 20, 21 provided in the core 41. The fan-type damping ducts 20, 21 are separated from one another by a fan wall 19. A wall thickness 29 of the fan wall 19 is less than a height 30 of a damping duct 20 or 21. The cross-sectional area 33 of the fan wall 19 is again considerably smaller than is the cross-sectional area 34 or 35 of the damping ducts 20 or 21. In the illustrated example the wall thickness 29 of the fan wall 19 is approximately 0.3 to 0.6 mm. The clear height 30 of the damping ducts 20 or 21 is larger, being 0.5 mm to 0.9 mm.

Values for damping ducts 20, 21 of a rear wheel damper 115 are typically, without being limited thereto, duct lengths 31 between approximately 10 and 30 mm, duct widths between approximately 5 and 20 mm, and duct heights between approximately 0.2 and 1.5 mm. Up to ten damping ducts 20, 21 may be present which may in turn be combined to form one or more groups. Within such a group the damping ducts 20, 21 are separated from one another by fan walls 19 whose wall thicknesses are typically between 0.2 and 1 mm.

The clear flow cross-section, being the sum total of all the damping ducts 20, 21, largely depends on the duct shape, the fluid employed, the piston surface, and the desired range of force. The clear flow cross-section typically lies in the range between 10 and 200 square millimeters.

Figure 10:
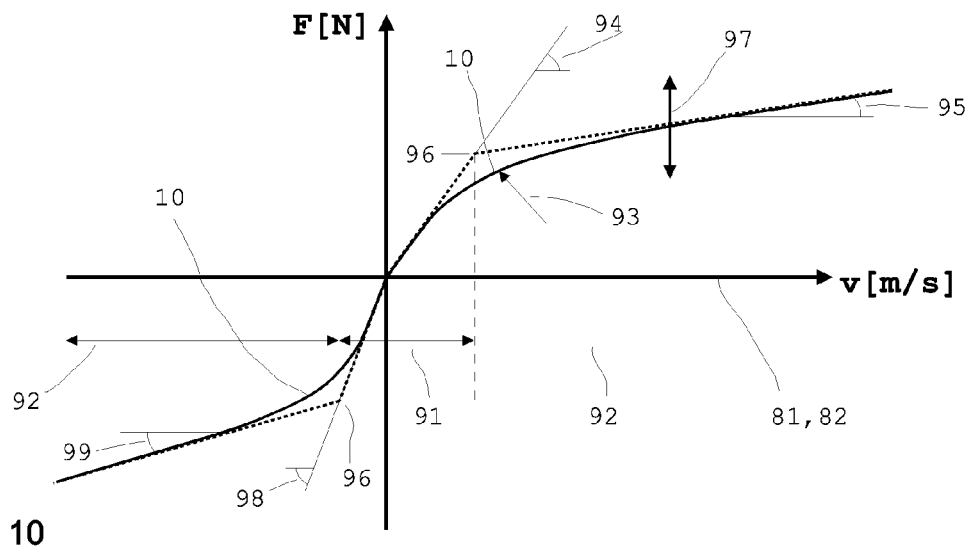
FIG. 10 is a first schematic illustration of a characteristic damper curve for the shock absorber according to FIG. 3.

FIG. 10 shows a characteristic damper curve 10 of the shock absorber 100 according to FIG. 3 with the damping valve 8 in a force-speed diagram. The low-speed range 91 and the high-speed range 92 are connected with a radius 93 by way of a gentle rounding. The characteristic damper curve 10 is presently asymmetric. Although the characteristic damper curve 10 basically shows similar curve paths for the compression and rebound stages, the gradient in the rebound stage is specified to be steeper than in the compression stage.

The characteristic damper curve 10 is set electrically in real time at all times, taking into account the hydraulic basic damping, such that in each instance of a shock or event or each disturbance 85 a suitable damping force 84 is set even while the shock 85 or the disturbance is occurring.

The gradient 94 of the presently shown characteristic damper curve 10 in low-speed range 91 can be well approximated both for the compression stage and the rebound stage, by way of a straight line showing a substantially linear gradient 94 or 98. The characteristic damper curve 10 presently shown runs through the origin of coordinates such that, given a relative speed of the damper piston 5 of zero, there is no damping force. This allows a very soft and agreeable responsivity.

In the high-speed range 92 the gradients 95 and 99 are presently also specified as substantially linear. Curved intermediate sections 93 may extend in-between so as to avoid break points 96. Or else a linear intermediate section 93 or multiple linear or slightly curved intermediate sections 93 may be provided to approximate a curved path.

Furthermore an arrow 97 is plotted, indicating the effect of a magnetic field having different strengths. Given a higher magnetic field strength the characteristic damper curve shifts upwardly while with a weaker magnetic field it shifts downwardly.

A characteristic damper curve with no intermediate section 93 provided is plotted in a dotted line so as to result in more or less noticeable break points at the points 96. Such a characteristic damper curve can readily be fitted by dragging the original characteristic damper curve in predetermined or else freely chosen points. Comfortable embodiments may provide such setting by touching with a finger or a stylus and dragging to the desired shape.

The gradients 94 and 98 in the low-speed range 91 and the gradients 95 and 99 in the high-speed ranges 92 are modifiable and adaptable automatically or manually to the current preferences and conditions, as is the entire characteristic damper curve 10. In this way, as a different ground is recognized, a different characteristic damper curve can be selected automatically, specifying softer or else harder damping. Independently of the selected characteristic damper curve, each and every shock is dampened in real time at all times.

The gradients 95 and 99 in the respective high-speed ranges 92 are first specified but they can be changed any time as needed. The power supply for the control device and the electric coil serving as the field generating device 11 may also be provided by a battery, an accumulator, a generator, dynamo, or in particular a hub dynamo.

Figure 11A:
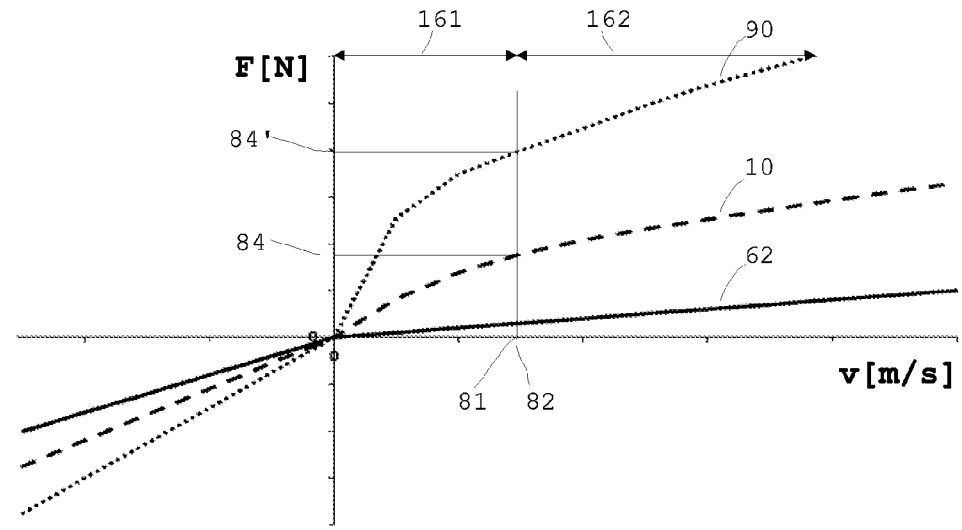
FIG. 11a is a schematic illustration of the basic hydraulic curve of the shock absorber according to FIG. 3 and two different characteristic damper curves.

FIG. 11a illustrates the basic curve 62 and two different characteristic damper curves 10 and 90. It shows the damping force plotted over the speed ratios of the components 101 and 102 relative to one another. The components 101 and 102 may be the two ends of a shock absorber or else represent the frame and the wheel.

The basic curve 62 represents the hydraulic properties of the shock absorber 100 where no magnetic field is applied. The gradients of the basic curve 62 in the compression stage and in the rebound stage differ due to the one-way valves 17 and in the rebound stage they are steeper than in the compression stage.

The characteristic damper curves 10 and 90 are asymmetric in FIG. 11a. The characteristic damper curves 10 and 90 represent the resulting damping forces over the relative speed and they are composed of the damping force of the basic curve 62 and the magnetically generated damping force. This means that at a specific compressing or rebounding speed, a damping force cannot be set lower than the damping force of the basic curve 62. The basic curve 62 must be taken into account in designing. Weaker damping is not possible due to the principle. On the other hand, given a particularly small difference between a characteristic damper curve 10 and the basic curve 62, the electric energy required is particularly low such that a certain adaptation of the basic curve 62 to the softest characteristic damper curve provided is useful. The softest characteristic damper curve provided may e.g. be the characteristic damper curve 10.

A basic curve 62 with "useful" properties ensures reasonable emergency running properties in case that the power supply ceases to provide sufficient energy. Also possible and preferred is a mechanically adjustable emergency valve to provide adjustable emergency running properties.

In the illustrated characteristic damper curve the gradients in the compression stage and the rebound stage are different. In the rebound stage the gradient 96 is approximately linear on the whole. In the rebound stage there is virtually no differentiation between the low-speed range 91 and the high-speed range 92.

In the compression stage, however, the low-speed range 91 and the high-speed range 92 show different gradients 94 and 95 in both the plotted characteristic damper curves 10 and 90.

The control device 46 periodically scans the sensor 47 at short, equidistant time intervals of e.g. 1 ms, 2 ms or 5 ms. The control device 46 computes from the signals a characteristic value 81 for the characteristic value 82. The characteristic value 82 in this embodiment corresponds to the relative speed 82 of the relative motion between the first and second components. It is possible for the control device 60 to obtain from the sensor signals a relative speed 82 to be employed as the characteristic value 81. In the simplest of cases the sensor 47 directly obtains the associated relative speed. In another simple case the sensor 47 or the control device 46 obtains from the sensor signals a change in path or position of the components 101 and 102 relative to one another. When the time interval between two measurements is known, a relative speed 82 and thus a characteristic value 81 can be derived therefrom. If the time interval between two measurements is substantially constant, a change in position or relative motion may be directly used as the characteristic value 81.

It is also possible to obtain from values from acceleration sensors or from a set of parameters of multiple different sensor values, a characteristic value 81 which is representative of the current relative speed 82. One embodiment provides for the data from acceleration sensors and/or displacement sensors to be coupled such that on the one hand, quick responses are possible to rapid changes due to jumps or roughness of road, and on the other hand, precise positioning and speed sensing is achieved in slower actions.

With the characteristic value 81 thus obtained, the associated damping force 84 or 84' is obtained by means of the characteristic damper curve 10 or e.g. 90 stored in a memory device. The associated magnetic field and the associated current intensity of the coil 11 are derived and adjusted in real time. This means that a cycle is completed within 20 ms and as a rule within 10 ms. Measurements may be taken more frequently, e.g. at time intervals of 5 ms or even at time intervals of 1 or 2 ms or faster still. The control device 60 processes the sensor signals received, generating by means of the coil 11 a magnetic field of a suitable field intensity for generating the damping force pertaining to the characteristic value 81. The magnetic field acts within the provided cycle time of e.g. 10 ms, adjusting the desired damping force 84.

If the relative speed 82 has changed after another measuring period, a correspondingly different magnetic field is generated such that the control cycle consisting of sensor 47, control device 46 and damping valve 8 serving as the actor observes the desired response time, adapting the system in real time.

Figure 11B:
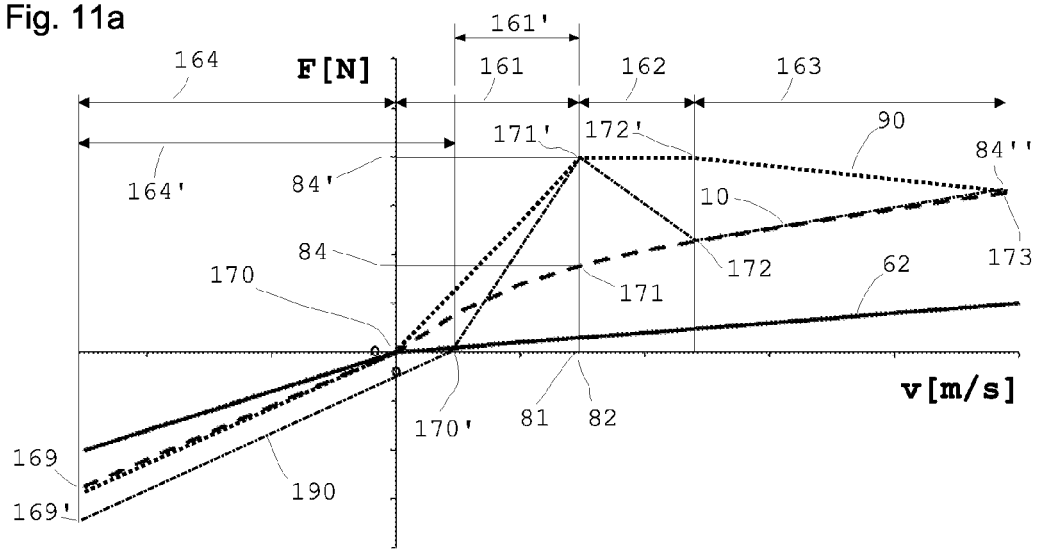
FIG. 11b is a schematic illustration of another characteristic damper curve.

FIG. 11b illustrates the characteristic damper curve 10 from FIG. 11a. Furthermore, a characteristic damper curve 90 is shown which has been generated from the characteristic damper curve 10 for example by dragging the points 169, 170, 171, 172 and 173 or by modifying single sections of the characteristic curve 161, 162, 163, 164 and 165.

FIG. 11b shows another illustration of characteristic curves. For example the content of FIG. 11b may be shown on a graphical display and a touch-sensitive display 57. For example if the characteristic damper curve 10 from FIG. 11b is captured in the point 171 and locally dragged toward the point 171', then the characteristic curve will thereafter show a considerably steeper incline from zero. When the characteristic curve is thereafter dragged from the point 172 to the point 172', this will result in a linear path between the points 171' and 172' on the new characteristic curve 90 where the damping force virtually does not change. The characteristic damper curves 10 and 90 rejoin at the point 173. Thus, the new characteristic damper curve 90 will be the path plotted in the dotted line where the characteristic damper curve 90 has been modified in the sections 161, 162 and 163. The section 164 remains unchanged. The path of the characteristic damper curve 90 is independent of the path of the characteristic damper curve 10. This means that the sections 161, 162, 163 and 164 of the characteristic damper curve path are basically independent of one another. Thus, damping may be weaker in the section 163 than in the section 162, as it is plotted. This cannot be readily achieved with conventional shock absorbers since the flow resistance and thus the damping force increases as the flow speed increases. In particular can the path of the characteristic damper curve 90 be modified in the rebound stage independently of the path of the characteristic damper curve 90 in the compression stage.

When a high relative speed 82 has been measured the shock absorber 100 even allows to reduce the damping force 84 by way of reducing the effective magnetic field at the electric coil device 11 for example by reducing the current intensity.

The characteristic damper curve 90 may be stored and/or modified further as desired. The point 170 lies at the zero passage of force and it also describes the zero passage of the relative speed.

Another characteristic damper curve 190 can be readily set by dragging or modifying the points. The point 169 has been displaced toward the point 169'. The zero passage at the point 170 may likewise be shifted toward the point 170' toward positive (or else negative) relative speeds. In this way the section 164' is increased and the section 161' is reduced. It is further shown that the point 171' was left in place and the point 172' was dragged back to the point 172. Now if the point 173 remains unchanged, the illustrated dash-dotted path of the characteristic damper curve 190 will result. This shows illustratively that the rebound stage and the compression stage can be adjusted separately from one another. Measurements have shown that in bicycle dampers, response and cycle times of 10 or 20 ms are entirely sufficient for adjusting damping in real time.

Figure 12:
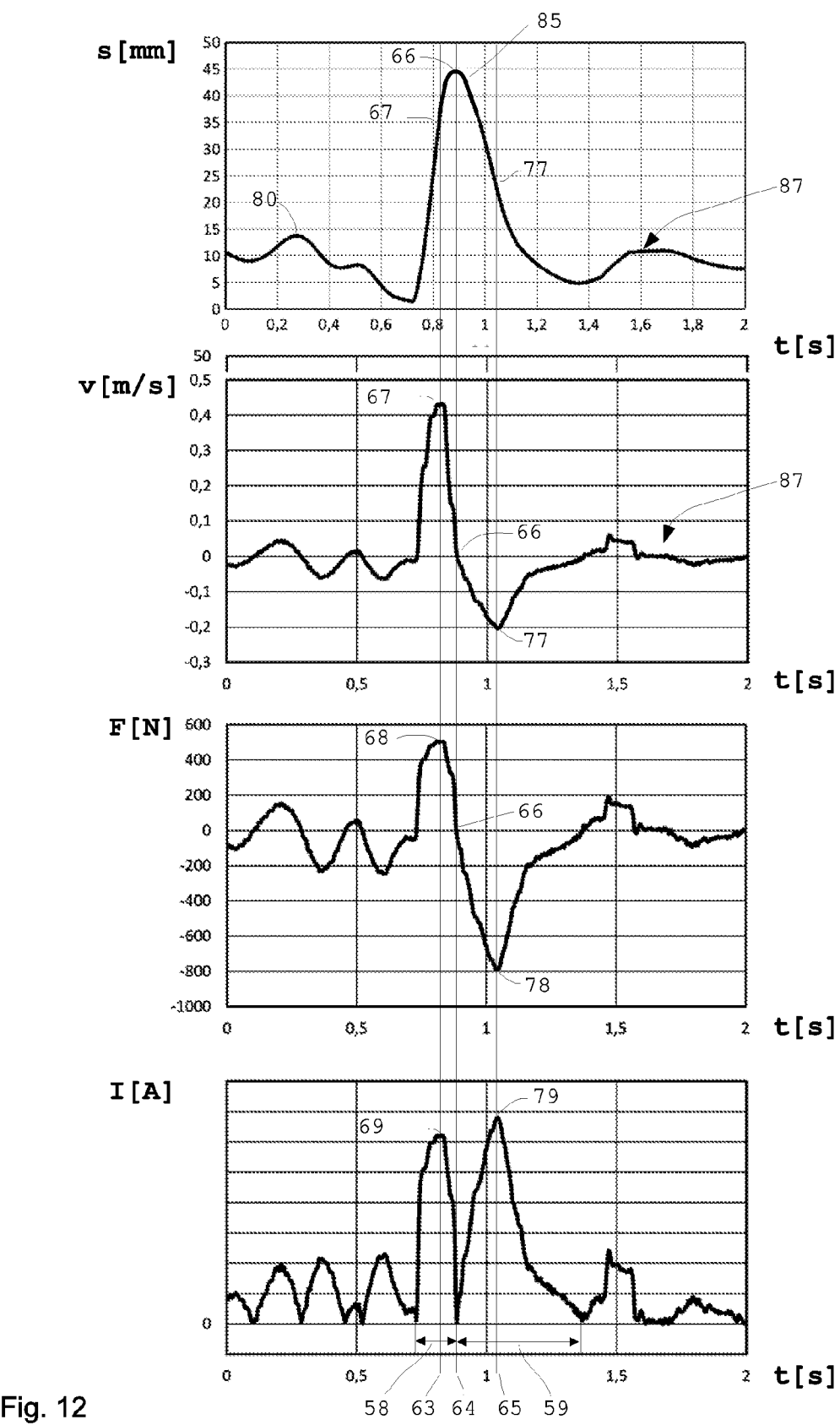
FIG. 12 is the time paths of the suspension travel, the piston speed, the damping force, and the applied current intensity, of the shock absorber according to FIG. 3 during a jump.

This is also shown in the data of an actually measured and dampened jump as illustrated in FIG. 12.

FIG. 12 shows, one above the other in a number of separate diagrams over time the measurement and control data recorded during a jump performed with a bicycle. The characteristic damper curve employed corresponds e.g. to the characteristic damper curve 10 in FIG. 10. If a characteristic damper curve 90 from FIG. 11b were used, the paths would be completely different even for identical original jump conditions!

The topmost diagram illustrates the suspension travel in millimeters over time in seconds with the entire time scale only showing 2 seconds. Beneath, the relative speed, the damping force, and the current intensity are illustrated accordingly over the same time interval.

Initially the shock absorber 100 is located inside the SAG position and is compressed about 12 mm. During the jump which is the event 85 the shock absorber 100 rebounds such that the damping piston 5 is in nearly complete rebound at approximately 0.75 seconds.

After touchdown on the ground the rear wheel begins compressing, obtaining a maximum compressing and thus relative speed 67 in the compression stage which occurs at approximately 0.8 seconds and presently achieves values above 0.4 m/s. At the same time the maximum damping force 68 of presently approximately 500 N is generated at the maximum of the current intensity 69 in the compression stage.

A very short time later the maximum compression 66 is reached at the time 64 where the relative speed 67 reaches zero. Accordingly the control device reduces the current intensity to zero such that the damping force is zero.

Thereafter the rebound stage damping follows while the shock absorber 100 rebounds once again. At the same time the current intensity increases accordingly for adjusting a damping force which corresponds to the relative speed 67 given the characteristic damper curve set.

The maximum relative speed 77 will occur in the rebound stage at the time 65 which presently results in a maximum current intensity 79 for generating a maximum damping force 78 of approximately 600 N.

The duration of the jump results from the duration 58 of the compression stage of approximately 0.2 seconds and the duration 59 of the rebound stage of approximately 0.5 seconds, plus the preceding rebound phase.

It immediately follows from the durations indicated that a regulating speed of 250 ms is not sufficient. In order to operate at real time, the system must respond within at least 50 ms and better within 20 ms which is presently ensured.

The regulating speed including capturing a sensor signal, deriving a characteristic value, adjusting the current intensity, and adjusting the damping force 84, is presently less than 10 ms. Thus the control cycle 12 or the control loop is passed through about 200 times within the time period illustrated in FIG. 12.

The characteristic damper curve which can be adjusted graphically allows to adapt the characteristic damper curve as desired to one's own requirements or simply to adopt a characteristic damper curve from third parties.

In all the operating modes of the shock absorber 100 the sensor device 47 employed is preferably at least one displacement sensor. The sensor device 47 is preferably read e.g. at a frequency of 2 kHz and a resolution of 12 bits. In theory, given a stroke of a rear wheel damper 115 of 50 mm once in every 0.5 ms, the relative motion can be determined at an accuracy of 12 μm. Unlike thereto, a suspension fork 114 shows a stroke of e.g. 150 mm, such that under the same conditions a relative motion can be determined at an accuracy of 36 μm.

The data captured by means of the sensor device 47 preferably pass through a low-pass filter and are used for computing the speed wherein a specific damping force is computed by way of the current speed, direction, and the set characteristic damper curve. This computing operation is repeated e.g. at 500 Hz such that a new force specification is generated once in every 2 ms. An electric current to be set is obtained from the damping force based on the known correlation between the damping force and the field intensity required therefor and in turn the current intensity required therefor. In particular a dedicated electric current regulator sets the respective electric current at the electric coil device at the shock absorber by way of this specified force such that the resulting damping force is traced sufficiently fast and substantially corresponds to the specification.

The conversion to a digital signal of a relative motion measured by analog meter and the subsequent computing of the specified electric current or the electric current to be set requires hardly any resources, and using a state-of-the-art microcontroller it can be done in a matter of mere microseconds. The electric current regulator provides adequately fast response of the electric coil device such that, notwithstanding inductivity and eddy currents, an electric current jump from 0 to 100% is possible in very few milliseconds.

What is advantageous for the responsivity of the electric current regulator is, the low-pass filter and computation of the relative speed wherein a compromise must be found between fast response and filter effect. The filter parameters may be dynamically adapted to the prevailing situation.

Given fast filtering, a relative motion or change in position will in the worst case scenario be recognized in the subsequent regulating pulse after 2 ms and will then be processed within a few microseconds. The current regulator will virtually instantly work toward implementing the new specification of current. The damping force acts after some delay following the specification of electric current. The response time of the magneto-rheological fluid (MRF) is less than 1 ms. The rigidity of the system is also of minor importance. Depending on the concrete structure the new nominal value of the damping force is obtained within a few milliseconds. Jump response times of less than 10 ms are readily feasible with the system and have been verified successfully in the past. Depending on the requirements and available manufacturing costs, faster components may be employed which allow jump response times in the region of one-digit milliseconds.

Regulation may also be based on fuzzy logic and/or learning.

Preferably all the dampers may be linked electrically to form one system. In this case e.g. relevant data are transmitted from a first damper to a second damper in real time such that it can better adapt to the event. For example the damper in the suspension fork can transmit the information to the rear wheel damper such that the latter can anticipate e.g. a severe shock. The entire system will thus be more efficient. Also/or a hydraulic link of two or more dampers is possible (open or closed hydraulic system).

The damper device may comprise two or more controllable damping valves having one (or multiple) field generating device(s). These may be attached external of the components and movable relative to one another. It is also possible to provide at least one permanent magnet which generates a static magnetic field. The strength of the magnetic field effectively acting in the damping valve can then be modulated in real time by the magnetic field generated by the electric coil serving as the field generating device.

On the whole the invention provides a suspension control and an advantageous bicycle allowing to control both a rear wheel shock absorber and a suspension fork. Different basic damping in the compression and/or rebound stages is enabled in a simple way. The difference depends on the orientation of the one-way valves in the flow apertures. In this way a flexible and comprehensive adaptation to many different requirements can be ensured. Controlling takes place in real time so as to provide prompt and immediate response to all the occurring events, disturbances, shocks or obstacles.

Operation is both flexible and still simple. Changes to the shock absorber are possible even while riding downhill or while riding through open terrain while offering comfortable coarse and fine adjustment options of the damper settings.

The following is a summary list of reference numerals and the corresponding structure used in the above description of the invention:

1 damper device
  2 damper housing
  3 first damper chamber
  4 second damper chamber
  5 damping piston
  6 piston rod
  7 damping duct, flow duct
  8 damping valve
  9 field-sensitive medium, MRF
  10 characteristic damper curve
  11 field generating device, electric coil device
  12 control cycle
  13 collection chamber
  14 flow aperture
  15 flow aperture
  16 through hole
  17 one-way valve
  18 valve opening
  19 fan wall
  20 damping duct 21 damping duct
22 one flow side
23 other flow side
24 flow direction
25 inlet
26 suspension device
27 first spring chamber
28 second spring chamber
29 wall thickness
30 clear extension
31 length
32 width
33 cross-sectional area
34 cross-sectional area
35 cross-sectional area
36 ring conductor
37 spring piston
38 cable
39 end position
40 damping piston unit
41 core
42 insulating material
43 flow valve
44 adjusting means
45 memory device
46 control device
47 damper sensor, sensor
48 data
49 display
50 electronic unit
51 input sensor, control knob
52 step
53 internet
54 network interface
55 radio network interface
56 step
57 touchscreen, graphical control unit
58 duration compression stage
59 duration rebound stage
60 control device
61 battery unit
62 basic curve
63 time
64 time
65 time
66 max. compression
67 max. relative speed
68 max. damping force
69 max. current intensity
70 step
71 equalizing space
72 equalizing piston
73 holder
74 magnet
75 plunger
77 max. relative speed
78 max. damping force
79 max. current intensity
80 relative motion
81 characteristic value
82 characteristic parameter, relative speed
83 field intensity to be set
84 damping force
85 event
86 relative position
87 time interval
90 characteristic damper curve
91 low-speed range
92 high-speed range
93 transition region
94 gradient
95 gradient
96 break point
97 arrow
98 gradient
99 gradient
100 shock absorber
101 component (first end)
102 component (second end)
111 wheel, front wheel
112 wheel, rear wheel
113 frame
114 fork, suspension fork
115 rear wheel damper
116 steering device, handlebar
117 saddle
120 supporting structure
150 operator's control device
151 actuating device
152 adjustment device
153 mechanical input device
154 control
155 control
156 control
160 smartphone
161 section
162 section
163 section
164 section
165 section
166 section
169 point
169' point
170 point
170' point
171 point
171' point
172 point
172' point
173 point
173' point
190 characteristic damper curve
200 bicycle
300 suspension control

The invention claimed is:

1. A suspension control apparatus for an at least partially muscle-powered two-wheeled vehicle, comprising:
at least one damper device having at least one controllable damping valve and being configured to serve to dampen a relative motion between a first component and a second component;
a control device and a memory device;
said control device and said memory device defining at least one characteristic damper curve that is characteristic of a correlation between a damping force and a characteristic parameter of a relative motion between the first and second components;
at least one electric operating device configured to modify the defined characteristic damper curve during a ride of the two-wheeled vehicle, in at least two sections of the characteristic damper curve; and
an operator's control device having two or more controls with which the characteristic damper curve can be varied, said operator's control device including a touchscreen enabling the characteristic damper curve illustrated thereon to be modified by touching and dragging.

2. The suspension control apparatus according to claim 1, wherein the characteristic parameter is derived from a relative speed of the relative motion between the first and second components.

3. The suspension control apparatus according to claim 1, which comprises at least one sensor device, and wherein:
said control device and said at least one sensor device are configured and set up for periodically obtaining at least one characteristic value of a relative speed of the first component relative to the second component; and
said control device is configured and set up to derive, by way of the characteristic value, from the characteristic damper curve stored in said memory device a pertaining setting for the controllable damping valve and to set the damping valve accordingly so as to set a damping force ensuing from the characteristic damper curve based on the characteristic value obtained.

4. The suspension control apparatus according to claim 1, wherein a zero passage of the characteristic damper curve can be shifted.

5. The suspension control apparatus according to claim 1, wherein a modified characteristic damper curve is set and/or stored in said memory device and/or retrieved from the memory device within a given time period of less than 1 minute.

6. The suspension control apparatus according to claim 1, wherein said operator's control device is configured to set a characteristic damper curve where, with a higher relative speed, a lower damping force is set than with a lower relative speed.

7. The suspension control apparatus according to claim 1, wherein said operator's control device is configured to set a characteristic damper curve where a rebound damping is set independently of a compression damping.

8. The suspension control apparatus according to claim 1, wherein said damper device comprises a magneto-rheological fluid serving as a damping medium and wherein said damping valve includes an electric coil device assigned thereto serving as a field generating device, and wherein a current intensity of said electric coil device is periodically reset within periods that are shorter than 1 second.

9. A bicycle, comprising:
a supporting structure having a frame, a steering device, and two wheel support accommodations at said supporting structure configured to receive two wheels;
at least one suspension control apparatus according to claim 1 configured for damping a relative motion of at least one of said two wheels, or of both of said wheels, relative to said supporting structure.

10. The bicycle according to claim 9, wherein said steering device comprises a handlebar, an actuating device of said suspension control apparatus is attached to said steering device, and said actuating device comprises at least one mechanical input device in a region of a lateral end of said handlebar.

11. A suspension control apparatus for an at least partially muscle-powered two-wheeled vehicle, comprising:
at least one damper device having at least one controllable damping valve and being configured to serve to dampen a relative motion between a first component and a second component;
a control device and a memory device;
said control device and said memory device defining at least one characteristic damper curve that is characteristic of a correlation between a damping force and a characteristic parameter of a relative motion between the first and second components;
at least two different electric operating devices configured to modify the defined characteristic damper curve during a ride of the two-wheeled vehicle, in at least two sections of the characteristic damper curve, said electric operating devices including an actuating device and an adjustment device, and wherein said two electric operating devices are suitable and set up to modify independently of one another at least one damper property of the damper device so that at least one damper property selected by said actuating device is also modifiable by way of said adjustment device.

12. The suspension control apparatus according to claim 11, wherein said actuating device is configured more robust and better protected from impacts than sad adjustment device and wherein at least said actuating device offers protection according to IP54 band protection from external impacts according to IK06.

13. The suspension control apparatus according to claim 11, wherein said actuating device comprises separate controls for setting a parameter selected from the group consisting of a damper hardness, a lockout, and a see-saw suppression.

14. A suspension control apparatus for an at least partially muscle-powered two-wheeled vehicle, comprising:
a controllable damper device having at least one controllable damping valve and being configured to serve to dampen a relative motion between a first component and a second component;
an electric control device for controlling said damper device;
at least two electric operating devices that are different in complexity, said electric operating devices including a less complex operating device serving as an actuating device and a more complex operating device serving as an adjustment device, said electric operating devices being suitable and configured to modify independently of one another at least one damper property of said damper device so that at least one damper property selected by said actuating device is also modifiable by way of said adjustment device.

15. A method for controlling a suspension of an at least partially muscle-powered two-wheeled vehicle having at least one controllable damper device with at least one controllable damping valve, wherein the damper device is configured to dampen a relative motion between a first and a second component and the damper device is controlled by an electric control device, the electric control device together with a memory device defining a characteristic damper curve describing a correlation between a damping force and a characteristic parameter that is characteristic of the relative motion between the first and second components, the method comprising:
selectively modifying the characteristic damper curve, while the two-wheeled vehicle is being ridden, by way of an adjustment device, in at least two segments of the characteristic damper curve;
graphically displaying the characteristic damper curve on a display and enabling the curve to be modified on the display, optionally by touching and dragging points or sections on the display.

16. A method for controlling a suspension of an at least partially muscle-powered two-wheeled vehicle having at least one controllable damper device with at least one controllable damping valve, wherein the damper device is configured to dampen a relative motion between a first and a second component and the damper device is controlled by an electric control device, the method comprising:

provide two different electric operating devices for setting the damper device and selectively setting the damper device by operating an actuating device and by operating an adjustment device, so that the actuating device modifies at least one damper property of the damper device independently of the adjustment device so that a damper property selected by the actuating device can also be modified by the adjustment device.

17. The method according to claim 16, which comprises graphically displaying a characteristic damper curve on a display and enabling the curve to be modified on the display, optionally by touching and dragging points or sections on the display.

* * * * *